Feb. 2, 1971    R. E. BAUER    3,559,294
POTENTIOMETER TILT INDICATOR
Filed July 16, 1969    2 Sheets-Sheet 1

INVENTOR
RUSSELL E. BAUER
BY
Hauke Gifford & Patalidis
Attorneys

Feb. 2, 1971  R. E. BAUER  3,559,294
POTENTIOMETER TILT INDICATOR
Filed July 16, 1969  2 Sheets-Sheet 2

INVENTOR
RUSSELL E. BAUER
BY
ATTORNEYS

United States Patent Office 3,559,294
Patented Feb. 2, 1971

3,559,294
POTENTIOMETER TILT INDICATOR
Russell E. Bauer, Grosse Pointe, Mich., assignor, by mesne assignments, to KDI-Bauer Corporation, Warren, Mich., a corporation of Delaware
Filed July 16, 1969, Ser. No. 842,228
Int. Cl. G01c 9/06, 9/08
U.S. Cl. 33—206                      5 Claims

ABSTRACT OF THE DISCLOSURE

A tilt indicator having a partially liquid filled housing is provided with a potentiometer fixably mounted therein and connected in an appropriate electrical circuit. A shaft extending from a slider contact of the potentiometer has fixably secured thereto a pair of arms extending outwardly normal to the shaft, each of which has a float mounted thereon. As the indicator is tilted the liquid and floats remain in the same position relative to the earth and the slider contact moves with respect to the potentiometer resistor creating an output voltage which can be correlated to the angle of tilt of the indicator. In one embodiment a counterweight extending normally to the shaft and arms in a direction away from the liquid provides stabilization of the shaft and float assembly during periods of acceleration and the like. In a second embodiment, the liquid associated with the undersides of each float is separated into two chambers, connected by means of a passageway which restricts the displacement of the fluid from one chamber to the other and thereby stabilizing the shaft and float assembly during periods of acceleration and the like.

BACKGROUND OF THE INVENTION

(1) Field of the invention

This invention relates to tilt indicators and more particularly to an improvement in stabilizing such indicators when they are subject to acceleration forces and the like.

(2) Description of the prior art

Heretofore tilt indicators have been designed which comprise weights freely suspended from a pendulum that is mounted on a shaft extending from the slider contact of a potentiometer. The potentiometer housing is fixed to an outer case which undergoes the rotation or tilt to be measured. When the casing is tilted the slider contact on the pendulum shaft moves relative to the winding of the potentiometer creating a variation in the output voltage of the potentiometer connected in an appropriate electrical circuit. This output voltage is proportional to and indicative of tilt of the casing. The disadvantage inherent in such a design is that the weight on the pendulum must be such as to overcome the internal friction of the potentiometer and a satisfactory weight generally imposes too great a thrust load on the bearings of the potentiometer.

A device which has successfully overcome the disadvantages of the pendulum type tilt indicator is disclosed in the patent to Morton Steimler No. 2,722,056. Such a device is provided with a casing having a potentiometer fixedly mounted therein with a shaft extending from the slider contact of the potentiometer. A pair of arms extending outwardly normal to the shaft are fixably secured thereto. On the end of each arm is mounted a float. The casing is partially filled with a liquid to such a point that the buoyant force of the liquid acting on the floats overcomes the weight of the arm and the floats so that there is no increased load on the bearings of the potentiometer. As the casing is tilted, the liquid and float assembly remain in the same position relative to the earth, whereby the slider contact of the potentiometer moves with respect to the winding. A recording apparatus is provided which records the output voltage produced thereby and this output voltage is correlated to the angle of tilt of the casing.

Although such a device has been successful in overcoming the disadvantages of the prior art devices, it is subject to undue oscillation when the casing is tilted due to an external force such as acceleration forces or the like.

SUMMARY OF THE INVENTION

The present invention relates to a tilt indicator having a housing with a potentiometer fixedly mounted thereon. In one example of the present invention a rotatably mounted shaft extends from the slider contact of the potentiometer and has a pair of arms extending outwardly normal from the shaft. Each arm has a float mounted thereon. The housing is partially filled with a liquid which provides a buoyant force on each of the floats. As the indicator is tilted the liquid and float assembly remain in the same position relative to the earth and the slider contact moves with respect to the potentiometer resistor creating an output voltage which can be correlated to the angle of tilt of the indicator. A counterweight extending normally to the shaft and float assembly in a direction away from the liquid stabilizes the shaft and float assembly during periods in which the tilt indicator is subjected to external forces such as those created by acceleration and deceleration and the like.

In a second embodiment of the present invention, a rotatably mounted shaft extends from the slider contact of the potentiometer into a housing partially filled with an appropriate liquid. The shaft is secured to a single float unit at its mid-section at a point above the level of the liquid so that the shaft is not submerged therein. The housing is of a generally cylindrical shape with the axis of the potentiometer shaft coinciding with the longitudinal axis of the housing. The lower section of the housing, which is partially filled with the liquid for providing the buoyant force on the undersides of the float unit is provided with a wedge-shaped member, the apex of which is proximate the tilt axis of the float relative to the housing. The wedge-shaped member reduces the amount of volume available underneath of the float unit and forms two fluid chambers on opposite sides of the housing, which are connected by a longitudinal passageway formed between the underside of the float unit at its mid-section and the apex of the wedge member, and which restricts the rate of flow between the two chambers as the housing is tilted, and thus, tends to have a stabilizing effect on the float unit during periods of acceleration, deceleration and the like. The restricted passageway formed between the tilt axis of the float and the apex of the wedge-shaped member may be utilized alone or in conjunction with a counterweight for providing the aforementioned stabilizing effect on the float. As the indicator is tilted, the liquid and float unit remain in the same position relative to the earth and the slider contact moves with respect to the potentiometer resistor creating an output voltage which can be correlated to the angle of tilt of the indicator.

It is therefore an object of the present invention to provide an improved and stabilized device for indicating the degrees of tilt in which a slider contact of a potentiometer moves relative to the fixed winding to vary the output voltage thereof in response to variations in the angle of tilt of the device.

DESCRIPTION OF THE DRAWINGS

The several objects, applications and advantages of the present invention will be made apparent to those skilled in the art when the accompanying description of some examples of the best modes contemplated for practicing the invention is read in conjunction with the accompanying drawings in which.

DESCRIPTION OF THE PREFERRED EMBODIMENTS

Figure 1:
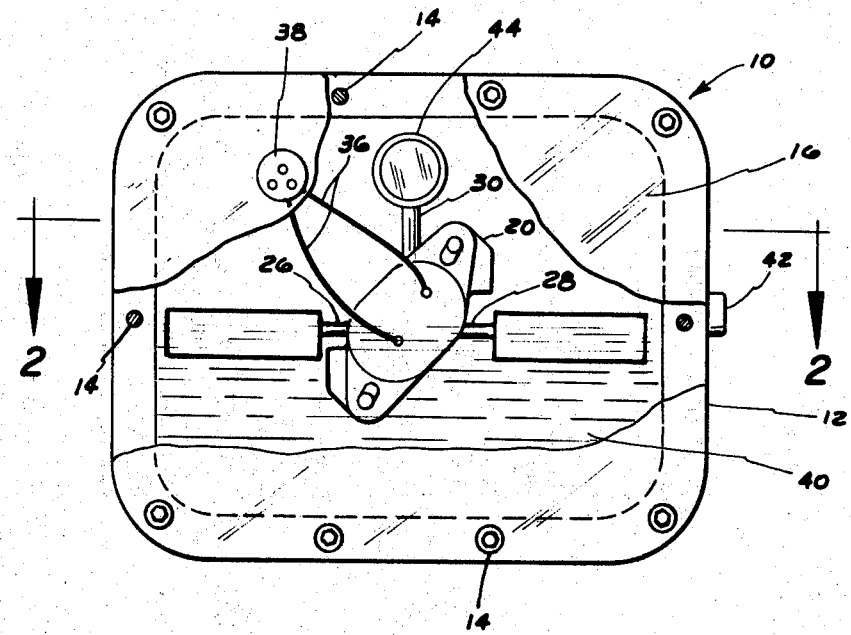
FIG. 1 is an elevational view of an example of a preferred embodiment of the present invention with portions of the face plate broken away to show the internal construction.
Figure 2:
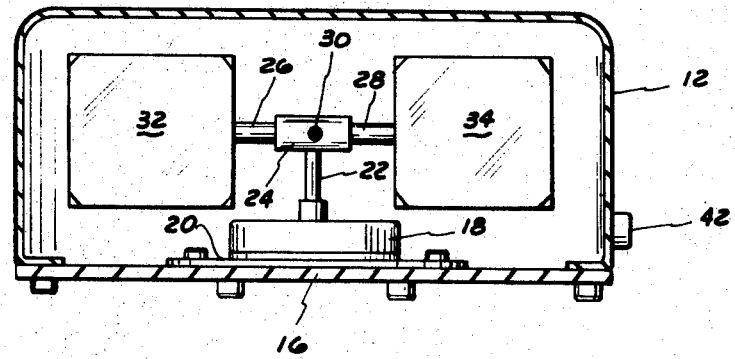
FIG. 2 is a transverse sectional view taken along line 2—2 of FIG. 1.

Now referring to the drawings for a more detailed description of the present invention, one example of a preferred embodiment for the practice of the invention is illustrated in FIGS. 1 and 2 as a tilt indicator 10. The indicator 10 comprises a casing 12 which has secured thereto by means of screws 14 a face plate 16. A protentiometer 18 which may be of any well known variety having a fixed resistor and a slidable contact member is suitably secured to the inner surface of the face plate 16 by a means of an adjustable bracket 20. Alternatively the potentiometer may be mounted to the outer surface of the face plate 16. A shaft 22 extends outwardly from the potentiometer housing and is attached by any suitable means to the slidable contact. A collar 24 having a plurality of bores disposed therein is secured to the outer end of the shaft 22 by any suitable means such as by a set screw (not shown). Arms 26, 28 and 30 press fitted within the collar bores extend outwardly and normally from the shaft 22. A pair of float members which are of a rectangular shape and indicated by the numerals 32 and 34 are respectively mounted on the ends of the arms 26 and 28. The potentiometer 18 is provided with electrical leads 36 extending therefrom to a connector plug 38 which is mounted in the face plate 16.

The casing 14 is partially filled with a liquid 40 such as mercury by way of a filler plug 42 which is disposed in an aperture formed in the housing 14. Mercury or another heavy liquid is preferable as the floating medium as the correcting force acting on the floats 32 and 34 is directly proportional to the Specific Gravity of the liquid 40, however a silicone oil or water may be utilized with satisfactory results. Since mercury is being used as a preferred fluid, proper sealing and insulating means are utilized for the electrical leads 36 and the potentiometer 18.

Sufficient liquid is inserted in the casing so that a buoyant force is supplied to the floats 32 and 34 which overcomes the weight of the floats and shaft assembly such that there is no added bearing thrust on the shaft of the potentiometer.

The float assembly is provided with a counterweight 44 mounted on the arm 30 and is secured thereto by any suitable means. As seen in FIG. 1 the counterweight 44 is so positioned that it is normal to both the shaft 22 and the float arms 26 and 28.

It may be desirable to use such a tilt indicator on a gun mount which is disposed upon a vehicle such as a tank or the like. It therefore becomes quite important that the float assembly becomes stable as rapidly as possible when subjected to an external force such as the force created by acceleration or deceleration of the vehicle upon which the tilt indicator is mounted. In viewing FIG. 1 if one visualizes the tilt indicator traveling in a rightwardly direction and undergoing deceleration, the liquid 40 will tend to travel in a counterclockwise direction carrying the floats 32 and 34 and shaft 22 in a counterclockwise direction, whereas, the forces acting on the counterweight 44 will be such as to urge the same in a clockwise direction thereby resisting the movement of the floats 32 and 34.

Depending upon the type of application in which the tilt indicator is to be utilized, the composition, specific gravity and viscosity of the liquid 40 may be selected and the mass of the counterweight 44 and the length of the arm 30 can be designed such as to provide a stabilizing effect on the float assembly over a wide range of external forces.

Figure 4:
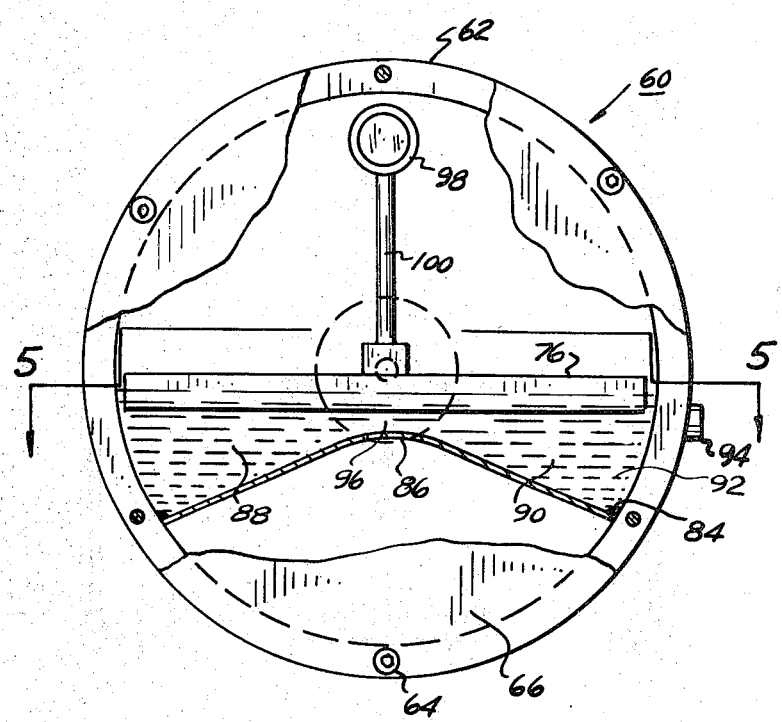
FIG. 4 is an elevational view of another example of an embodiment of the present invention with portions of the face plate broken away to show the internal construction.
Figure 5:
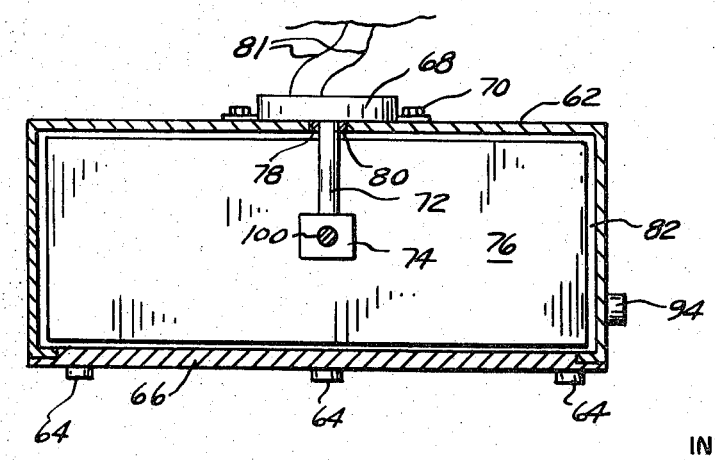
FIG. 5 is a transverse sectional view taken along line 5—5 of FIG. 4.

Referring to FIGS. 4 and 5 for a detailed description of another example of an embodiment of the present invention, there is illustrated a tilt indicator 60, which comprises a generally cylindrically shaped housing 62 which has secured thereto by means of screws 64 a face plate 66. A potentiometer 68, which may be of any well known variety, having fixed resistor and a slidable contact member, is suitably secured to the outer surface of the housing 62 by any means, such as mounting screws 70. The slider shaft 72 of the potentiometer extends outwardly from the potentiometer housing through the wall of the housing 62 and is attached by any suitable means, such as, for example, set screw, not shown, to an upwardly extending member 74 formed at the mid-section of a float unit 76.

A bore 78 disposed within the wall of the housing 62 has a bushing 80 press fitted therein. The bushing 80 may be of any of the well known type of bearings for providing friction-less lateral support to the rotating shaft 72.

The float 76 is of a rectangular shape and is carried by the shaft 72 by means of the upwardly extending member 74 in such a manner that the shaft 72 is never submerged within the liquid filled portions of the housing 62. The float 76 is of such a size as to substantially cover the surface area of the liquid 92 such that the float 76 acts as a vane displacing the liquid 92 from one side to the other side of the housing 62 as the float is rotated about the axis of the potentiometer shaft 72.

The potentiometer 68 is provided with electrical leads 81 extending therefrom and adapted to be connected to a suitable electrical circuit for measuring the amount of tilt of the floats with respect to the housing 62 and which will be described in greater detail hereinafter.

In the lower portion of the housing 62, that is, within a portion of the volume beneath the undersides of the float 76 there is provided a generally wedge-shaped member 82, the peripheral edge of which is fastened to the inner surface of the housing 62 by any suitable means, such as by soldering, welding or the like as indicated at 84. The wedge-shaped member 82 may be formed as an integral portion of the housing 62 by casting them as a unit. Suitable sealing means provided along the outer edge of the metal wedge 82 where the same abuts the face plate 66 so as to prevent fluid communication therebetween. The apex 86 of the wedge-shape member 82, extends longitudinally across the cylindrical housing 62 beneath and proximate the mid-section of the float 76. The space between the underside of the float member 76 and the top surface of the wedge-shape member 82 form two chambers 88–90 which are adapted to be filled with a liquid 92, such as mercury by way of a filler plug 94 which is disposed in aperture formed within the housing wall 62. The two chambers 88–90 are in fluid communication by means of a restricted passageway 96, formed between the underside of the float 76 at its mid-section and the apex 86 of the wedge member 82.

The restriction 96 is sized such as to limit the flow of the liquid 92 from one chamber to the other when the float 76 is tilted toward one side or the other side of the wedge-shape member 82. This restriction of the flow between the chambers 88–90 acts as a dampener and thus tends to stabilize the float 76 during periods of acceleration, deceleration and the like.

As indicated hereinabove, mercury is the preferred fluid for use as a floating medium. A liquid with a high viscosity is not satisfactory for use in the devices disclosed herein as such a liquid would cause the floats, and thus the potentiometer, and output signal generated thereby to lag behind the actual tilt of the housing in a dynamic situation, that is, there would be a phase-lag between the signal and the actual tilt. In the tilt indicator 60, of FIGS. 4–5, the restricted pasageway 96 will tend to act in the same manner as if a more viscous liquid than mercury was utilized, thus, the restriction 96 must be sized to match the dynamic time cycle requirements of the device for any particular application.

Since the potentiometer 68 is mounted externally of the housing 62 and the shaft 72 is mounted above the mercury level, the need for sealing and electrical insulation is not necessary as is required in the device disclosed in FIG. 1.

Sufficient liquid is inserted in the casing so that the buoyant force supplied to the float 76, overcomes the weight of the float and shaft assembly such that there is no added bearing thrust on the shaft of the potentiometer.

The float assembly may be additionally provided, as shown, with a counterweight 98, which is mounted on an upwardly extending arm 100 by any suitable means. The arm 100 is attached to the top portion of the upwardly extending member 74 at the mid-section of the float 76. As seen in FIG. 4, the counterweight 98 is so positioned that it is normal to both the shaft 72 and the float 76. The counter-weight 98 will tend to stabilize the float 76 when the same is subjected to an external force such as a force created by acceleration or deceleration or the like in the same manner as hereinbefore described in the description of the embodiment disclosed in FIGS. 1–2.

Figure 3:
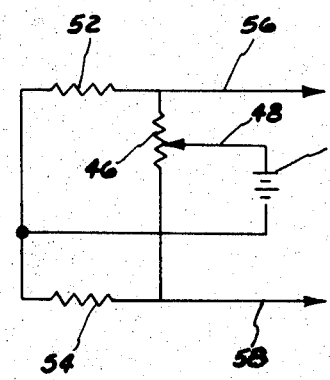
FIG. 3 is a schematic diagram illustrating the electrical circuitry of the present invention.

Referring to FIG. 3 for a description of an example of an electrical circuitry which may be employed with either of the embodiments of the present invention. The potentiometer 18 (or 68) is provided with a fixed resistor 46 having a slidable contact 48 disposed thereon. This slidable contact 48 is suitably connected to the shaft 22 (or 72). An electrical signal responsive to the rotational position of the float is generated by a bridge circuit which is comprised of four bridge legs including the potentiometer resistor 46 as one pair of bridge legs. The other pair of bridge legs is comprised of resistors 52 and 54 one of which may be of a variable type to permit an initial adjustment of the bridge circuit. A source of electrical energy indicated for purpose of illustration at 50 as a battery is connected between the junction of the resistors 52 and 54 and the slider contact 48. Leads 56 and 58 are connected respectively to the junction of the resistor 52 and the bridge leg formed by the resistor 46 on one side of the slider contact 48 and the junction of the resistor 54 and the other bridge leg formed by the resistor 46. Leads 56 and 58 are connected to an electrical indicating instrument (not shown) which serves to record the output of the potentiometer. The connector plug 38 (FIG. 1) serves to connect the electrical indicating instrument and source of electrical energy to the potentiometer 18, whereas the electrical lead 81 of the potentiometer 68 are connected directly thereto. It can thus be seen that any variation in the angle of tilt of the casing will cause a corresponding variation in the output voltage in the potentiometer which by means of the electrical indicating instrument can be correlated to indicate a visual reading of the degree of tilt.

It should be understood that the present invention may be utilized with other electrical indicating devices, such as those used within a stabilizing system. Such a device would ordinarily be connected to an amplifier and a servo-system for maintaining a particular item, such as a gun or missile launch pad, at a stabilized position or elevation with respect to the earth.

Having thus described the invention, what is claimed is:

1. In a combination with an indicating means of the type comprising: a casing; a shaft rotatably mounted within said casing; float means carried by said shaft, said casing being adapted to be partially filled with liquid to support said float means such that when the casing is tilted the float means and shaft are rotated with respect to the casing; means driven by said shaft for measuring the degree of rotation of said shaft; the improvement comprising: means for stabilizing said float means when said indicator is subjected to an external force such as acceleration, deceleration or the like, wherein the partially liquid filled casing on the underside of said float means is divided into at least two chambers wherein said stabilizing means comprises a passageway connecting said fluid chambers, said passageway being of such a size as to control the rate of flow between said two chambers, including a wedge-shaped member within said casing, the space between said wedge-shaped member and the underside of said float means forming said separate liquid filled chambers, the apex of said wedge-shaped member paralleling said shaft, with said fluid chambers being on opposite sides of said apex; and said restricted passageway being formed by the cross sectional area between the underside of said float means at its mid-section and the apex of said wedge member, said restricted passageway restricting the rate of flow between said two chambers as the casing is tilted.

2. The combination as defined in claim 1, wherein said liquid has a high specific gravity.

3. The combination as defined in claim 1, including a counterweight carried by said shaft and extending from said shaft in a direction above said liquid.

4. The combination as defined in claim 3, wherein said liquid is mercury.

5. The combination as defined in claim 1, wherein said float means is of a rectangular shape; said counterweight being carried by a shaft extending outwardly therefrom normal to both said shaft and said rectangular shape float.

References Cited

UNITED STATES PATENTS

| | | | |
|---|---|---|---|
| 1,552,691 | 9/1925 | Girvin | 33—206 |
| 2,722,056 | 11/1955 | Stinler | 33—206.5 |

LEONARD FORMAN, Primary Examiner

C. E. PHILLIPS, Assistant Examiner